(12) United States Patent
Holmes (10) Patent No.: US 11,140,114 B2
(45) Date of Patent: Oct. 5, 2021

(54) GEOLOCATION BASED DATA SHARING SYSTEM

(71) Applicant: Russell Holmes, Otley (GB)

(72) Inventor: Russell Holmes, Otley (GB)

( * ) Notice: Subject to any disclaimer, the term of this patent is extended or adjusted under 35 U.S.C. 154(b) by 28 days.

(21) Appl. No.: 16/501,617

(22) Filed: May 10, 2019

(65) Prior Publication Data

US 2019/0342249 A1 Nov. 7, 2019

Related U.S. Application Data

(60) Provisional application No. 62/720,424, filed on Aug. 21, 2018, provisional application No. 62/667,264, filed on May 4, 2018.

(51) Int. Cl.
| | |
|---|---|
| *H04W 24/00* | (2009.01) |
| *H04L 12/58* | (2006.01) |
| *H04W 4/021* | (2018.01) |
| *H04L 29/08* | (2006.01) |
| *G06F 16/9537* | (2019.01) |
| *G06T 19/00* | (2011.01) |

(52) U.S. Cl.
CPC .......... *H04L 51/20* (2013.01); *G06F 16/9537* (2019.01); *H04L 51/046* (2013.01); *H04L 51/12* (2013.01); *H04L 51/32* (2013.01); *H04L 67/1046* (2013.01); *H04W 4/021* (2013.01); *G06T 19/006* (2013.01)

(58) Field of Classification Search
CPC ........ H04L 51/20; H04L 51/046; H04L 51/12
See application file for complete search history.

(56) References Cited

U.S. PATENT DOCUMENTS

| | | | | |
|---|---|---|---|---|
| 2012/0088524 | A1* | 4/2012 | Moldavsky | G06Q 30/02 455/456.3 |
| 2012/0271883 | A1* | 10/2012 | Montoya | H04L 51/32 709/204 |
| 2013/0090130 | A1* | 4/2013 | Burrell | H04W 64/00 455/456.1 |
| 2013/0325856 | A1* | 12/2013 | Soto Matamala | H04W 12/001 707/724 |

* cited by examiner

*Primary Examiner* — Justin Y Lee
(74) *Attorney, Agent, or Firm* — K&L Gates LLP (57) ABSTRACT

A geolocation-based data sharing system and method which enables end users to connect and share electronic data of any form based on the users' interaction with geolocation points established by other users. The systems and method can be used to enable end users to share data, text, photos, music, etc. when a second user positions himself or herself in a position assigned by a first user.

20 Claims, 9 Drawing Sheets

GEOLOCATION BASED DATA SHARING SYSTEM

BACKGROUND

The present disclosure relates to a computerized data sharing system. More specifically, the present disclosure describes a geolocation-based data sharing system which enables end users to share computerized data, text, photos, music, etc. based on physical geolocation data recorded by end users within the system's databases.

Smartphones and other portable computing devices have become an indispensable part of everyday life. From texting, to video calls, etc. modern adults spend around five hours a day using their smartphones and tablets, with these devices traveling almost everywhere their users go. Almost all of these mobile devices contain a global positioning system (GPS) receiver (one or more antennas, microchips, etc.) which enable the devices to determine the physical location of device.

Some modern data sharing systems have taken GPS data into account when enabling the transfer of data from one user to another. For example, the popular dating applications and services Tinder and Grinder both take into account the end user's physical location (provided by GPS) when determining what other end users to match with a given end user. In these systems, GPS data enables those located physically near one another to be matched.

Other applications, such as the very popular Pokémon Go, utilize GPS data to enable an augmented reality treasure hunt of sorts. End users are able to venture around various locations and, within the application, find Pokémon, supplies, etc. The in-app treasure is unlocked based on actual real-world locations visited, as determined by GPS data.

The success of these apps and others demonstrate there is a large demand for geolocation-based entertainment platforms. In addition, there has been large levels of public interest in social networking sites (dating applications, image and multi-media sharing platforms, subject matter-based forums, etc.), especially on mobile devices. The existing social networking platforms have typically allowed connections based on existing friend or relationship groups.

Accordingly, there is a need for a geolocation-based data sharing system that enables end users to connect and share electronic data, including text, photos, music, etc. in a social media platform environment based on the users' interaction with geolocation points established by other users.

BRIEF SUMMARY OF THE INVENTION

To meet the needs described above and others, the present disclosure provides a geolocation-based data sharing system which enables end users to connect and share electronic data of any form based on the users' interaction with geolocation points established by other users.

By combining a geolocation-based entertainment platform and a social media platform, users are provided an enjoyable and interactive experience. Users are able to create social networks in real-time based on their physical location or based on locations that relate to a user's general interests. For example, each user can set one or more geolocation markers, whether at the user's current GPS location or a location of the user's choice on a map. The map may be based on the real-world, a fictional map of a virtual world, or a combination of a real-world map overlaid by a fictional environment. Each user sees the geolocation markers of other users using a map view. Users can also see their own location relative to the other users, geolocation markers, and/or other users' locations. When a user is within close proximity of a geolocation marker, an augmented reality geolocation marker icon is visible on a "camera view" provided by the mobile device. At that point, the user may unlock a connection to the user that placed the geolocation marker or other features in the system.

The platform allows users to form connections/relationships with new people based on geographical locations of shared interest. For example, requiring a user to travel to geographic locations in the real world in order to connect with another user's online profile adds a fun and entertaining element to the online social networking experience.

For example, if an end user of the platform was a big fan of country music, the user could set a geolocation-based marker at a country music festival to share the user's contact details with other users. Not only would the person seeking to find this geo-marker have to travel outdoors, as opposed to a static means of finding relationship matches online (e.g., not just browse a website), the other person would also have to attend a country music festival, which would presumably exclude those that dislike country music, thus boosting the chances for a successful match. This same method could also be applied to other events like sporting events, college classes, or even a church sermon for someone looking to meet another person of faith.

It should be noted a 'connection' formed between two end users could be either access to connection details of the user such as e-mail, telephone, social media links and/or access to a messaging/telephone platform within the system's graphical user interface (GUI).

One embodiment of the present system is embodied in a social networking/dating platform that matches users based on search criteria and connects them by requesting they travel to geolocation markers. A first user sets a number of geolocation markers at any chosen location using a digital map or the user's current global positioning system (GPS) location. The geolocations may specify, for example: a location; a first distance from the location within which other users may be considered to have visited the location; a second distance from the location within which other users must be to find the geolocation marker in a search; a duration/expiration time; and search criteria that may be used to identify the geolocation. A second user searching matching search criteria (e.g., sex, age, etc.) within the specified second distance of the geolocation marker, and while the marker is active, is then be able to view the location of the first user's geolocation markers on a digital map. Once the second user physically travels to the location of one of these markers (i.e., is within the first distance of the GPS location as confirmed by GPS data), the user is able to access and store the profile and contact information of the first user.

Either, or both, of the first and second distances described in the example above may be set by a user or may be set by the platform. For example, in one embodiment, the search radius may be set by the user and the distance used to determine arrival at the location may be set by the platform.

Users may also place or allocate a geo-marker associated with different types of information (e.g., photos, video, document files, etc.) that can only be accessed and stored by another user when the other user is within a specified distance of the geo-marker. These geolocation markers can be placed anonymously by users or associated with the user's account and may be in the form of a single-user geolocation marker, a group geolocation marker, or a public geolocation marker (for all users of a platform). Once a connection between two users has been made (e.g., via selection of a geolocation marker while a user is within a specific proximity), then each user may send the other user further information via further geolocation markers or traditional communication means (e.g., SMS message, email, text, voice call, etc.).

For example, a platform focused around dating may allow the first user to provide a second user access to a photo of the first user by interacting with a geolocation marker placed by the first user. This would require the second user to travel to the location of the geolocation marker to access and save the photo.

In other embodiments, users may be able to provide geolocation markers to entire groups of connections and/or all users on the platform. In yet other embodiments, geolocation markers may be placed by the platform itself for individuals, groups, or all users of the platform. Again, the placement of the geolocation markers includes identifying a location and specifying a distance from the location (i.e., proximity to the location) within which the system treats users as having visited the location. The distance may be specified by the platform or by the user identifying the location. For example, in some instances, the platform may require users to be located within a certain number of feet of a given geolocation marker before treating the user as having arrived at the geolocation marker. In other examples, a user may specify that distance. A distance may be any size. For example, it is contemplated that in some examples, the specified distance might be measured in miles.

Yet another embodiment of the present invention may also utilize multiple GPS based geo-markers to enable various challenges or tasks to be set up by end users within the present system. For example, if a young single woman who was very serious about physical fitness is looking for a partner (romantic or otherwise), the young woman could set two geo-markers a few miles apart (in this example) and require another user to travel between the two markers on a designated path within a certain time (tracked via GPS data collected by the system) if the second user wishes to be matched with her. The system could also use the rate at which the end users are traveling between the two designated geo-markers to prevent cheating by use of a car or other means.

The end user device interface may feature both a map view and augmented reality view, which can be switched between on the fly. For example, an end user may look at a top down map view of all geo-markers in their general area (a few blocks in this example) to locate all geo-markers previously set by other end users. When they approach a given geo-marker, the end user may then opt to switch to an augmented realty view (or the system may do this automatically). In the augmented reality view, the end user attempting to find a geo-marker may view an augmented reality enhanced view of the area physically surrounding the user with the geo-marker potentially being placed anywhere in that area. The geo-marker could be set at another end user's favorite booth in a restaurant, on the top shelf of a liquor store, or at the bottom of a pool, for the truly adventurous. Each end user can then select the found geo-marker to receive various types of data and/or switch back to the map view and find other markers.

Geo-location markers may also be automatically collected by the system when a user travels within a close proximity of a given marker. This enables the user to collect geo-markers throughout the day and review them at a later time. This passive means of marker collection may be preferable to consumers, as opposed to having to actively interact with each geo-marker within the system's GUI.

The geolocation markers in the system may expire after a given duration. That duration may be specified by the platform or the user. For example, some geolocation markers and the access to the data they enable may only be active for minutes, while others may remain active for days or months. In some embodiments, geolocation markers, and the access they provide, may be turned on and off by a user, as desired.

In one example, a geolocation-based data sharing system includes: a first mobile user device including a first GPS receiver, a first communications module, and a first graphical user interface; a second mobile user device including a second GPS receiver, a second communications module, and a second graphical user interface; a server including one or more data storage devices, wherein the server is in communication with each of the first communications module and the second communications module, the server further including a controller and a memory coupled to the controller, wherein the memory is configured to store program instructions executable by the controller; wherein in response to executing the program instructions, the controller is configured to: receive, by the server and from the first mobile user device, a first data set to be stored in the memory storage device; receive, by the server and from the first mobile user device, a first GPS location (chosen by the first user or by the platform itself) and a first set of searchable data to be stored in the memory storage device in association with the first data set; store and associate, by the server in the memory storage device, the first data set, the first GPS location, and the first set of searchable data; in response to receiving, by the server and from the second user device, search input data matching the first set of search data, display a geolocation marker identifying the first GPS location on a graphical user interface in the second mobile user device; and receive a request, by the server and from the second user device, to access the first data set; wherein, when the second user device is within a first distance of the first GPS location, enable the second user device to access the first data set, further wherein, when the second user device is outside of the first distance of the first GPS location, do not enable the second user device to access the first data set; and in response to gaining access to the first data set, enable the second user device to communicate with the first user device, whether peer-to-peer or through the server.

In another example, a geolocation-based data sharing method includes the steps of: providing a server including one or more data storage devices, wherein the server is in communication with each of a first communications module in a first mobile user device and a second communications module in a second mobile user device; receiving, by the server and from the first mobile user device, a first data set to be stored in the memory storage device; receiving, by the server and from the first mobile user device, a first GPS location (chosen by the first user or by the platform itself) and a first set of searchable data to be stored in the memory storage device in association with the first data set; storing and associating, by the server in the memory storage device, the first data set, the first GPS location, and the first set of searchable data; in response to receiving, by the server and from the second user device, search input data matching the first set of searchable data, displaying a geolocation marker identifying the first GPS location on a graphical user interface in the second mobile user device; and receiving a request, by the server and from the second user device, to access the first data set; wherein, when the second user device is within a first distance of the first GPS location, the server enables the second user device to access the first data set, further wherein, when the second user device is outside of the first distance of the first GPS location, the server does not enable the second user device to access the first data set; and in response to gaining access to the first data set, enabling, by the server, the second user device to communicate with the first user device, whether peer-to-peer or through the server.

In some embodiments, the first data set is a dating profile. For example, the dating profile may include an age or age range and a sex or gender. It may also include photos and additional information.

The search input data matching the first set of searchable data may be communicated to the server by the second user device in response to a manually executed search by a user of the second mobile user device or it may be communicated to the server by the second user device automatically in response to the second mobile user device entering a second distance of the first GPS location.

In some embodiments, the first GPS location is updated in real-time to be the position of the first mobile user device. In some embodiments, the first GPS location expires after a prescribed duration. That duration may be provided/selected by the user or by the platform.

In some embodiments, when the second user device is inside the first distance of the first GPS location, the server enables the second user device to access the first data set only after the second user device has interacted in a prescribed manner with a second GPS location. In some embodiments, displaying a geolocation marker identifying the first GPS location on a graphical user interface in the second mobile user device includes displaying an augmented reality element as the geolocation marker.

An object of the present invention is to create an augmented reality, accessible via a geolocation-based data sharing end user application, which enables end users to explore their surrounding areas and find new information, music, movies, friends, etc. The present system enables end users to create a media rich augmented reality environment, overlaid and displayed upon a real-world map. This media rich augmented reality environment creates a new level of interactivity with and engagement of end users not previously possible.

An advantage of the present invention is its potential to encourage exercise as well as more community involvement. Modern technology has created a much more efficient society but has in some ways hampered real-world interaction. Most people can order food, do their work, and even find a date all from their smartphone. However, most if not all of these activities require no physical movement, let alone the need to leave one's home. The present system helps combat this sedentary lifestyle by requiring end users to venture outside to obtain dating matches, new music, new movies, etc.

Yet another advantage of the present invention is the potential for augmented reality marketing. The present system creates an augmented reality map of the real-world surrounding a given end user. This augmented reality map may feature various advertisements, and/or the system may play a short advertisement before providing the end user with a dating match, new song, etc. when the user reaches a certain geo-marker. The system may also provide directions which purposefully steer end users past certain businesses, landmarks, etc. during their quest to find a given geo-marker.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
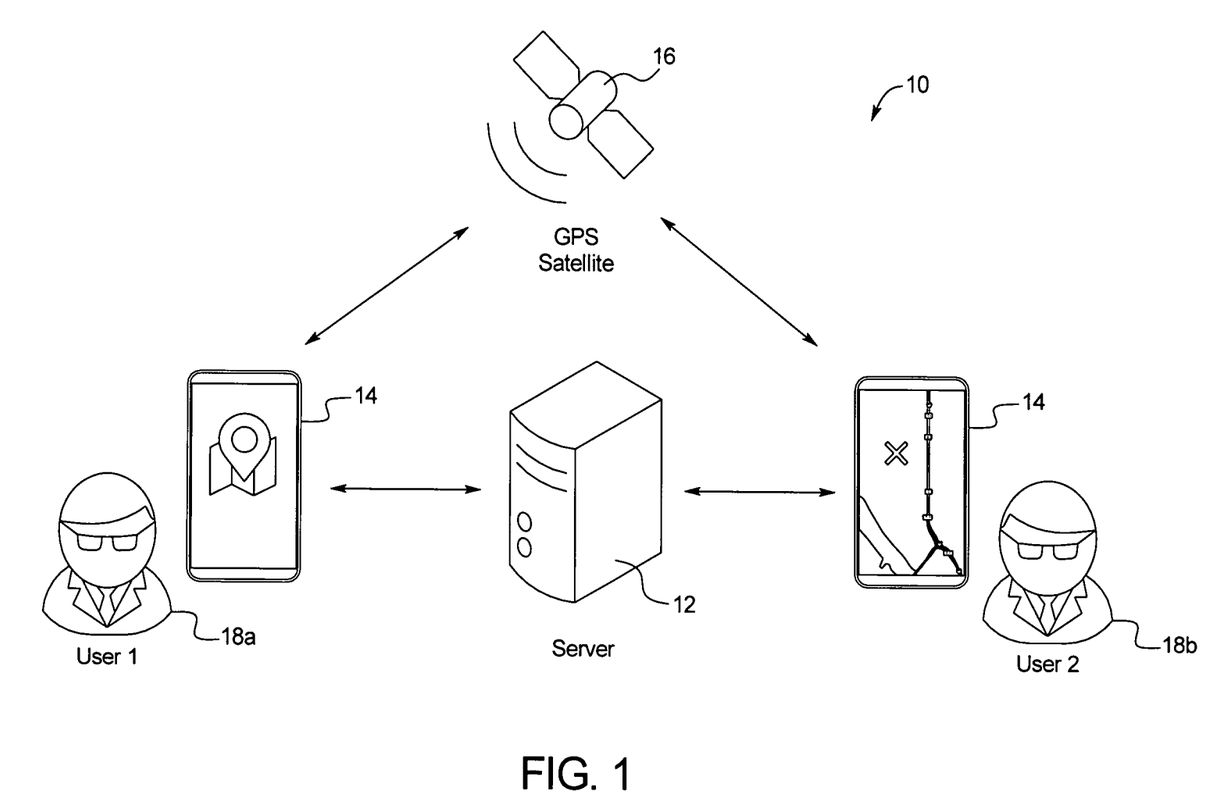
FIG. 1 is a schematic diagram of a geolocation-based data sharing system.

FIG. 1 is a schematic diagram of a geolocation-based data sharing system 10. As shown in FIG. 1, the system 10 may include a centralized server 12, end user devices 14, and a Global Positioning System (GPS) satellite 16. In this embodiment, there are two end users 18, end user one 18*a* and end user two 18*b*. Each user 18 creates a profile within the geolocation-based data sharing system 10 that includes details about the user 18, including his or her name, gender, age, and a photo. The user 18 then selects search criteria, such as an age range, a gender, and other specific interests. The user 18 also selects the gender and proximity from their location of users with whom the user 18 would like to connect.

End user one 18a utilizes his or her end user device 14, a mobile device (smartphone, tablet, etc.), to set a geolocation marker via a stand-alone end user device application. The end user device application enables end user one 18a to record and communicate his or her global position (obtained from the GPS satellite 16) to the centralized server 12. In some embodiments, the GPS location is updated in real-time such that the GPS location is a real-time indicator of the location of the end user device 14. The geolocation marker set by the first user 18a may feature GPS data as well as other information such as a dating profile, pictures, music, etc. All of this geolocation marker data is stored within one or more databases of the centralized server 12.

Once a geolocation marker is set by an end user 18 (e.g. first user 18a), the system 10 may then enable other end users 18 (e.g., second user 18b) to view this geolocation marker on a map when outside of the proximity settings and further to access this marker's data by physically traveling to the location set by first user 18a (i.e., being within a first distance defined by the proximity settings). It is noted that while "first user 18a" and "second user 18b" are used throughout the description to illustrate the examples provided, the terms "first" and "second" are used simply to provide clarification throughout the description and may be interchanged and are not intended to be limiting. For example, in the present example, the geolocation marker is set by the first user 18a and searched by the second user 18b. However, it is understood that each user 18 in the system 10 may take one of the varied roles at any point in time such that the second user 18b may be the one setting the geolocation marker and the first user 18a may be searching for that marker.

The system 10 may be configured to enable all end users 18 to access every geolocation marker set by other end users 18 or filter which markers are displayed based on various data concerning an end user 18. For example, if the system 10 was being utilized to support an online dating social network, various attributes about the end users 18 including demographic data, social media data, etc. might be utilized by the system 10 to display only relevant geolocation markers to end users 18. Alternatively, if the system 10 is utilized by an advertiser to set up a virtual treasure hunt, every end user 18 with access to this instance of the system 10 may be able to access each geolocation marker. End users 18 may also choose to manually send geolocation markers they set to other end users 18.

The location of the relevant (or all) geolocation markers stored by the system 10 may be displayed for other end users 18. For example, each of the users 18 that have selected search criteria in their respective profiles that correspond to the user data of the first user 18a may be shown the first user's geolocation markers. Display of such information may be carried out on a traditional digital map interface familiar to most smart phone users. The map may feature various icons, avatars, colored pins, etc. on the digital map which indicate the specific geolocation of a given marker. When an end user 18 (e.g., second user 18b) approaches the actual, physical geolocation of the marker (displayed as an "X" in this example) the system 10 may automatically (or manually) download the given geolocation marker's data, presuming the search criteria are met. The marker's data may contain various information about another end user 18 as well as a manner by which they may be contacted (e.g., email, phone number, etc.) or may also be anonymously set with the source of the data content of the marker protected by the centralized server 12 or even scrubbed to provide enhanced security.

Communication between the various elements of the present system 10 may be carried out via GPS signal, wireless telecommunication networks (e.g., 3G, 4G, 5G, EDGE, etc.), Wi-Fi, Bluetooth, and/or wired connections. It should be noted that the various components pictured may also be integrated into one another as technology advances with the need for a centralized server 12 and/or GPS satellite 16 varying for some applications.

For example, communication between end user devices 14 may be carried out solely via peer-to-peer connection and/or an arrangement where a server 12 is used to initially connect the end users 18 and their devices 14 and then a peer-to-peer connection is maintained going forward. Processing of information required for the system 10 to operate may also be carried out by the server 12 and/or the end user's mobile device(s) 14 depending on the scale and resources available for a given deployment of the system 10.

Figure 2A:
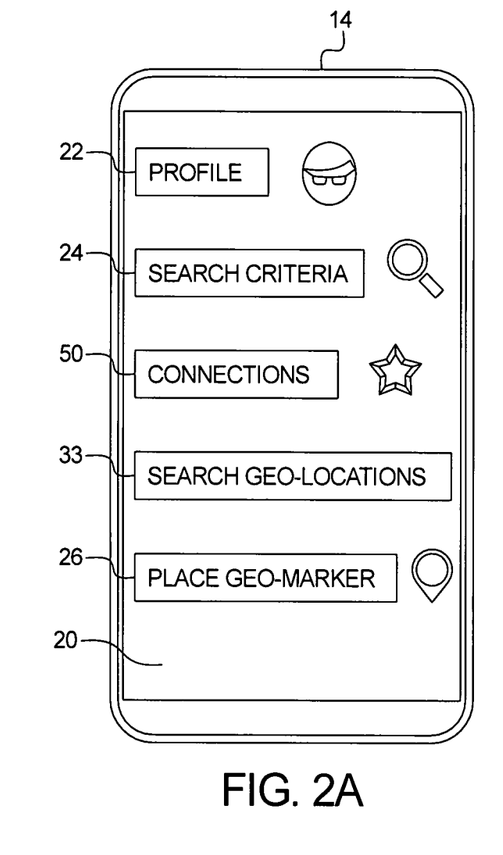
FIG. 2A is an example of a homepage screen of a graphical user interface of a geolocation-based data sharing system.

FIG. 2A is a homepage screen 20 of the graphical user interface of a geolocation-based data sharing system 10. As shown in FIG. 2A, users 18 can access different system screens (and functions) from the homepage screen 20. At a first step, a user 18a creates a profile, including his or her name, sex, age, and a photograph, by selecting the profile button 22 on the system 10. The profile information is a data set that is stored in the memory of the geolocation-based data sharing system 10. The user 18a may select the search criteria button 24 to select search criteria or search input data similar to Tinder or another dating application. The user 18a may select sex, age, and the proximity from their location as the search input data or search criteria to be used to find other users 18b with whom the first user 18a would like to connect. A data set comprising a user's profile information may include a subset of searchable data that can be searched by the system 10 when matching a first user, who sets the search criteria, with a second user, whose searchable data matches the first user's search criteria.

Figure 2B:
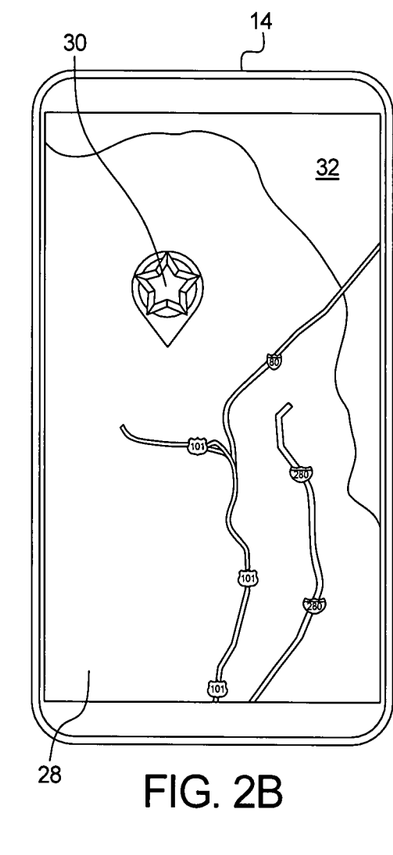
FIG. 2B is an example of a geo-marker placement screen of a graphical user interface of a geolocation-based data sharing system.

Before the user 18 accesses the search results, the user 18 selects the place geo-marker button 26 to access the geo-marker placement screen 28 shown in FIG. 2B. The user 18 places a number of his or her own geolocation markers 30 on a map 32 or at the user's current GPS location. The geolocation markers 30 are stored and visible to the user in the user's profile section on the platform. As shown in FIG. 2B, when an end user sets a geo-marker 30, they may do so via "pin-drop" similar to the function in Google Maps or other smart phone navigation applications. Users have the option to place geolocation markers 30 at their current GPS derived location or at any location shown on the map. In both instances a geolocation marker 30 and/or an augmented reality icon/object (such as a flag, or box, or marker) are set at these co-ordinates. The set locations of the GPS coordinates can be placed against a real-world map or a virtual world map laid over real world coordinates. One intention of the markers is that they are to be placed by users at locations that hold a specific level of interest for that person and therefore are also likely to hold a level of interest to other users that frequent that location.

For example, if someone frequents an art museum or is particularly interested in art, that person may choose to set a geo-marker at the Louvre. The system may also suggest such placement based on data obtained by the system from an end users social media profile(s), web usage, physical travel routine, etc.

Once the user 18*a* has placed one or more markers 30 via the geo-marker placement screen 28 of FIG. 2B and provided the search criteria, the user 18*a* may access the geo-locations 36 of other users 18 whose searchable data match the search criteria of the user 18*a*.

The user 18*a* may access the matching users' geo-locations 36 by selecting the search geo-locations button 33 on the home screen 20 shown in FIG. 2A. Selection of the search geo-locations button 33 directs the user to the geo-marker browsing screen 34 of the graphical user interface of a geolocation-based data sharing system 10 shown in FIG. 2C. In other embodiments, the geo-marker browsing screen 34 illustrating the geo-locations 36 of other users 18 whose searchable data match the search criteria may appear automatically in response to the first user 18*a* being within a specified distance of the users 18 of the geo-locations 36. This distance (e.g., automatically show matching results within a 2 mile radius) may be user selectable or may be determined by the system 10.

Figure 2C:
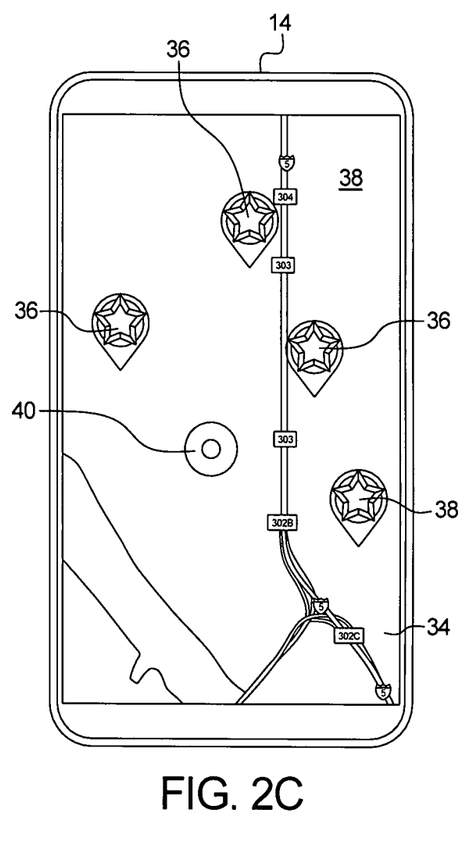
FIG. 2C is an example of a geo-marker browsing screen of a graphical user interface of a geolocation-based data sharing system.

As shown in FIG. 2C, the geo-marker browsing screen 34 displays the geolocation markers 36 of other users 18 on a map 38. Users can also see their own location 40 relative to the other user's location 36. The first user 18*a* may have the option to view the geolocation markers 36 of users that match their search criteria selections, providing the other users 18 have also identified the first user as part of their search criteria. For example, a first user 18*a* may have selected, females, aged 18-35, within five km of current location. The geolocation markers 36 of all users 18 of the platform that match this criteria and have placed geolocation markers 36 within the proximity of the first user 18*a* are visible to the first user 18*a* in the first user's geo-marker browsing screen 34.

Figure 3:
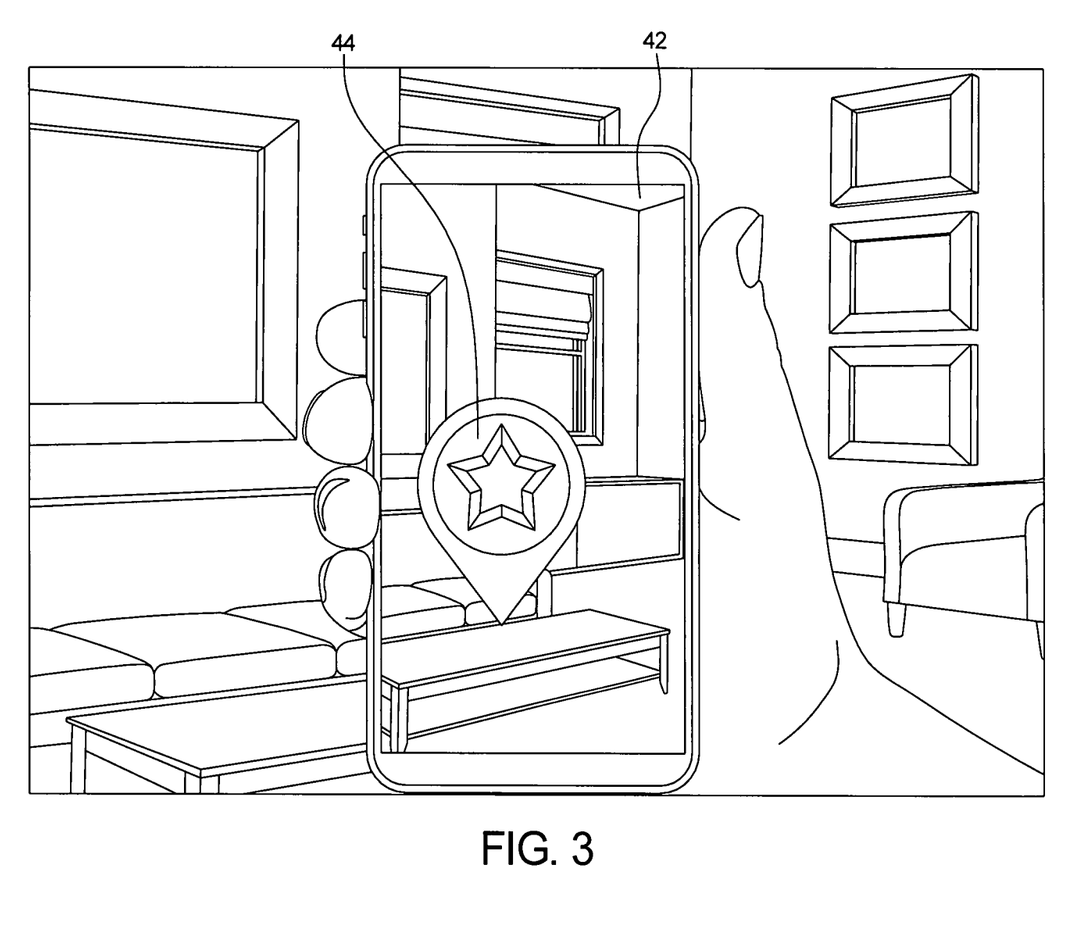
FIG. 3 is an example of an augmented reality screen of a graphical user interface of a geolocation-based data sharing system.

The visible geolocation markers 36 in this embodiment are visible as a pin or marker on a 2D or 3D map view, the geo-markers 36 may also be visible as an augmented reality object or marker via the camera view on a mobile device (see FIG. 3). The geolocation markers 36 may be in the visual form of something non-specific to the user (e.g., a nondescript pin, box, or emoji icon as shown here) or the markers may be something more specific to a given end user such as a graphic of their name or photo.

The geo-markers 30, 36 placed by a user 18 may last indefinitely or expire and be removed from view of other users 18 after a selected period of time determined by the user who sets the marker or by the platform itself. Each geolocation marker may have an individual expiration criterion, or all geolocation markers may have the same expiry duration. The durations for expiry may be set in seconds, minutes, hours, days, weeks, months or years.

The geo-markers 30, 36 may also be removed after they have been located and selected by a certain number of other users, this number of users can either be determined by the user themselves or determined by the platform. Each individual geolocation marker may have an individual maximum number of user selections or all geolocation markers may have the same number of maximum user selections before its expiry.

For example, once a first user 18*a* has placed multiple geolocation markers 30 that appear on a map of a second user 18*b* (with a matching search criteria), and once the second user 18*b* has traveled and collected one of the multiple markers 36 shown on the location map 38 from the first user 18*a*, the remaining geolocation markers for the first user 18*a* may no longer be visible on the second user's location marker map screen. A location marker map 38 may show hundreds of location markers (or more) from numerous users that have matching search criteria at any given time. In some instances, many of these markers 36 may be related to the same user 18*b*. However, when one of the markers 36 relating to a user 18*b* is collected by another user 18*a*, the remaining markers 36 of user 18*b* may no longer be visible to the user 18*a* that has collected it.

Users 18 may also be able to place a maximum number of geolocation markers 30 at any given time. This maximum number of geolocation markers 30 may be different for different users 18 within the platform and further geolocation markers can potentially be purchased within the platform for a set monetary value.

Live geolocation markers may also be utilized by the present system. These are geolocation marker that tracks the live GPS position of a given end user's device and present a moving target for other end users to seek out. Like the normal static markers discussed above, the user may elect for the live marker to expire after a duration of time or after a set number of geolocation marker selections by other end users. This type of marker may be appropriate for situations where a user is on a night out and wants to attract potential connections to meet immediately or could even be used as the basis for a sort of game. Similar to the popular children's game "Tag", end users could be required to find one another's live marker in alternating turns for several rounds before a match is made by the system or the system revealing more and more details about an end user after each subsequent match.

FIG. 3 is an augmented reality screen 42 of the graphical user interface of a geolocation-based data sharing system 10. As shown in FIG. 3, an augmented reality (AR) geolocation marker icon 44 is visible on the camera view of the mobile device when the user 18 is within a close and/or specified proximity of the marker 44. The system 10 may allow users to switch between the map view 34 (FIG. 2C) and the augmented reality camera view 42 to locate other users' geolocation markers 36. Once the user 18*a* is within a specified distance the GPS marker location 36 of another user 18*b*, the system 10 may allow the user 18*a* to the select the geolocation marker 44 (or an AR representation of the marker) by either touching the screen 42 or selecting the AR feature in a viewfinder (in this embodiment), thereby requesting access the first user's profile data. In some examples, the first user 18*a* may not have access to the profile data of the second user 18*b* if the first user 18*a* is not within the specified distance of the GPS marker. Still further, the second user 18*b* may specify the distance within which access to the profile data is provided. Once selected, the user 18*a* may access the profile information 46 of the user 18*b* that placed the geolocation marker 36, 44, as shown in FIG. 4.

There are a number of different methods by which a geolocation marker 44 can be selected by a first user once they are in close proximity. A user may select the option for the platform to automatically select a geolocation marker when there are within a set distance (e.g., 20 m, 50 m, 100 m) proximity of the marker. In another arrangement the user may select the geolocation marker by pressing an automatic push notification sent to their mobile device by the platform. In yet another arrangement a user my select the geolocation marker by selecting the marker icon on a 2D/3D map on their mobile device. In another arrangement the user may select the geolocation marker by capturing its AR marker in the camera view of the mobile device.

The AR geolocation markers may be in the visual form of something non-specific to the user (e.g., a nondescript pin, box, or emoji icon) or the markers may be something more specific to a given end user such as AR graphic of their name or photo. These specific and non-specific representations of the user geo-location markers may also be used in the map view (see FIGS. 2B and 2C). The AR geolocation markers may also be set upon a given object. For instance, if the geolocation marker was set within Wrigley Field, an end user could set their AR marker as the score board with the system displaying the scoreboard as a different color to other end users when viewed through the system's application. This would indicate to other end users that the scoreboard is also acting as an AR marker and that the person who set the marker is likely a baseball fan (in this example).

Figure 4:
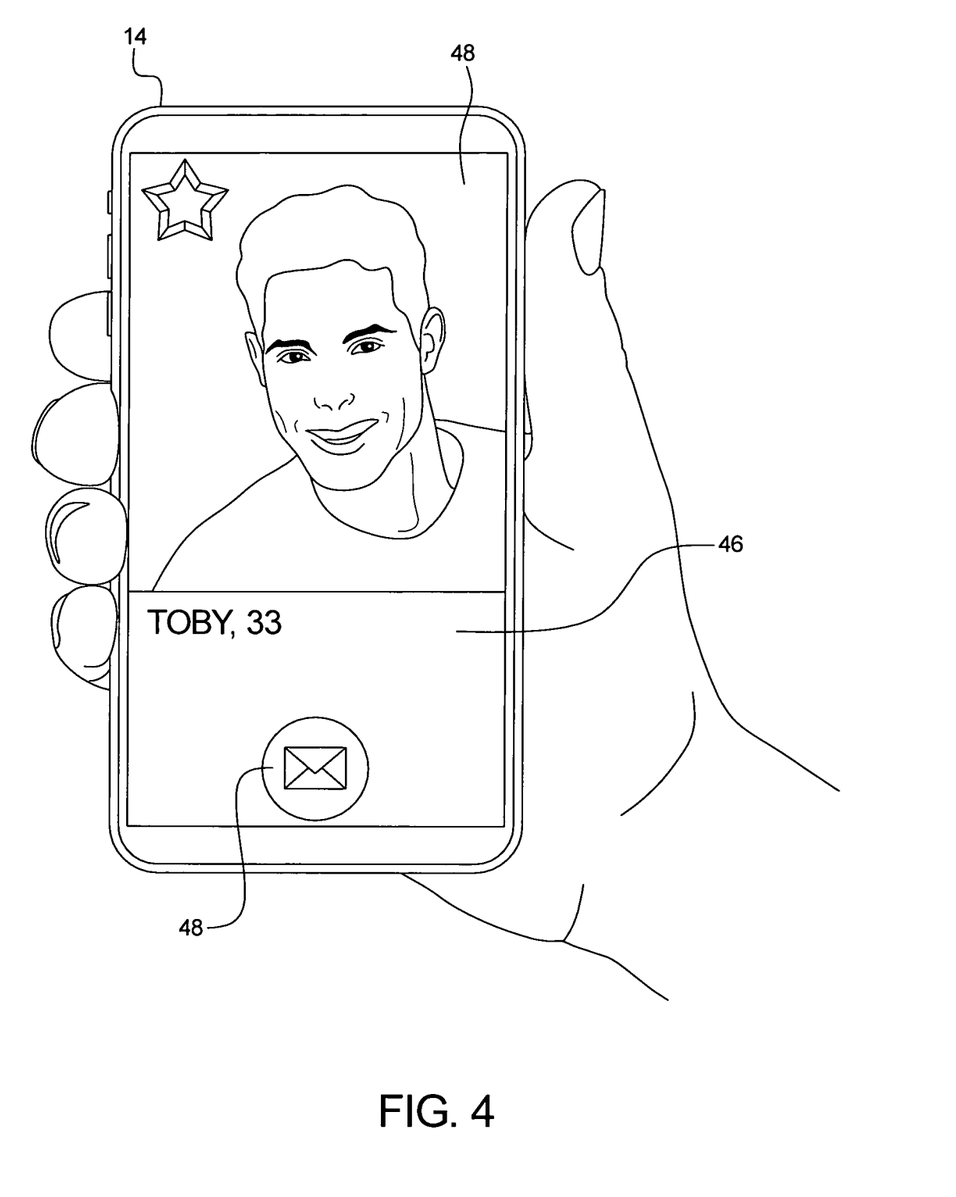
FIG. 4 is an example of a connected user profile screen of a graphical user interface of a geolocation-based data sharing system.

FIG. 4 is a connected user profile screen 48 of the graphical user interface of a geolocation-based data sharing system 10. As shown in FIG. 4, in this embodiment, once a user 18 has selected the geolocation marker 44 of another user, he or she may have access to the user's profile information 46. The profile information 46 includes the connected user's name and age, and gives the user 18 the option to contact the user via electronic messaging by selecting a message button 48. This profile and messaging information may be stored on the platform 10 within the connections section accessed by selecting the connections button 49 on the home screen 20, as shown in FIG. 2A.

As mentioned above, connections are made with other users by selecting their geolocation markers 44 when in close proximity to their locations. Once a marker 44 is selected, a user may have access to information about the user that placed the geolocation marker. This information may include, but not be limited to, the following: profile pictures, name, age, interests. The location, time, and date of the selected marker may also be saved and stored as part of the connection information. The user that selected the marker may also have the ability to send the user that placed the marker an electronic message via the platform once the connection has been made. This may involve the user that has selected the marker having the ability to send the initial message, via the platform, to the user that placed the marker. In another arrangement this may involve both users having the ability to message each other once the geo-marker has been selected in its geolocation.

In other embodiments of the present invention, each (or a single) user may be provided contact details for the connected user that can be used outside (or integrated with) the system, such as phone number or e-mail address. The platform may also give users the opportunity to share photo, video, audio, AR or virtual reality communications via the platform.

As a user collects multiple geolocation markers, he or she may build and store more connections within the system. These connections can be used to communicate and build new relationships for the user on social media, etc. in addition to the system.

The system may feature a GUI screen from which end users may view all the profiles associated with previously collected geolocation markers (e.g., connections formed within the system). These profiles may each have the option to message, call, or share documents with an end user associated with the given profile. This GUI screen may also enable end users to block or delete a connection formed with another end user. The block option may prevent another end user from being able to view the connection information (such as profile pic, messages, etc.) or interact with the blocking end user until such a time as the blocking user elects to unblock the blocked user. There may also be a delete option, which may remove a connection between two end users whereas the block function may prevent either user from being able to further see the connection information but not totally removing the connection.

Figure 5:
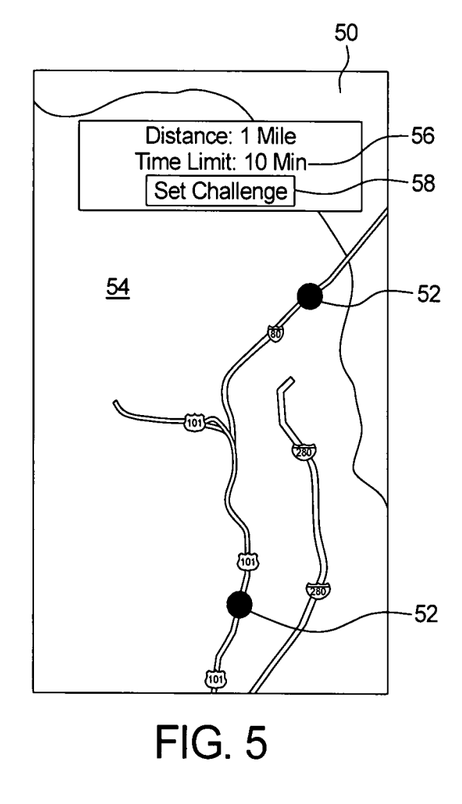
FIG. 5 is an example of an exercise challenge setup screen of a graphical user interface of a geolocation-based data sharing system.

FIG. 5 is an example of a physical challenge setup screen 50 of the graphical user interface of a geolocation-based data sharing system 10. As shown in FIG. 5, an end user 18a may create multiple geo-markers 52 in the system and require other end users 18b to travel between the first and second geo-markers 52 within a certain amount of time. In this embodiment, when the second user 18b is within the first distance of the first geo-marker 52, the system 10 enables a second user 18b to access the user profile of the first user 18a only after the second user 18b has interacted with the second geo-marker 52 in a prescribed manner, such as within a specified time frame. If the end user 18b successfully completes the challenge, he or she may be rewarded with another end user's dating profile information, new music, an exclusive movie trailer, etc. depending on how the system is being utilized.

In this example, the end user 18a has dropped two geo-markers 52 on the map 54 which are one mile apart. The end user 18a has also stipulated that there is a time limit 56 of ten minutes to travel between the two geo-markers 52 to successfully complete the challenge. It should be noted that this challenge can be attempted and/or completed a set number of times as dictated by the end user setting the challenge (or by the system automatically). To prevent cheating the system may also monitor an end user device's (smartphone, tablet, etc.) gyroscopes, accelerometers, etc. as well as synchronized smartwatches, pedometers, heart rate monitors, etc. to ensure the end user(s) attempting the challenge do not cheat. Once the user 18a has entered the details, the user 18a selects the set challenge button 58 so that the challenge registers with the system 10.

Figure 6A:
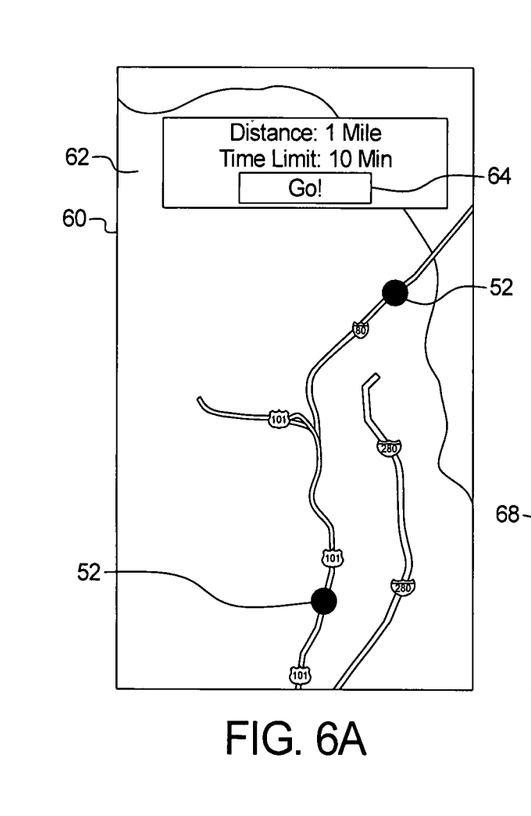
FIG. 6A is an example of an exercise challenge initiation screen of a graphical user interface of a geolocation-based data sharing system.

FIG. 6A is an exercise challenge initiation screen 60 of the graphical user interface of a geolocation-based data sharing system 10. As shown in FIG. 6A, if an end user 18b wishes to accept an exercise challenge 62, he or she approaches one of the geo-markers 52 set by another end user 18a and accepts the challenge 62 by selecting the go button 64. The system 10 may provide the end user 18b attempting a given challenge 62 basic information about the challenge 62 while not revealing, in this embodiment, any information about the user 18a who set the challenge.

It should be noted that like the dating profile search criteria mention above (see FIG. 2A), the exercise challenge 62 may also be tailored based on basic search criteria (e.g., a man may only want to complete challenges set by a woman looking to meet a man or vice versa).

Figure 6B:
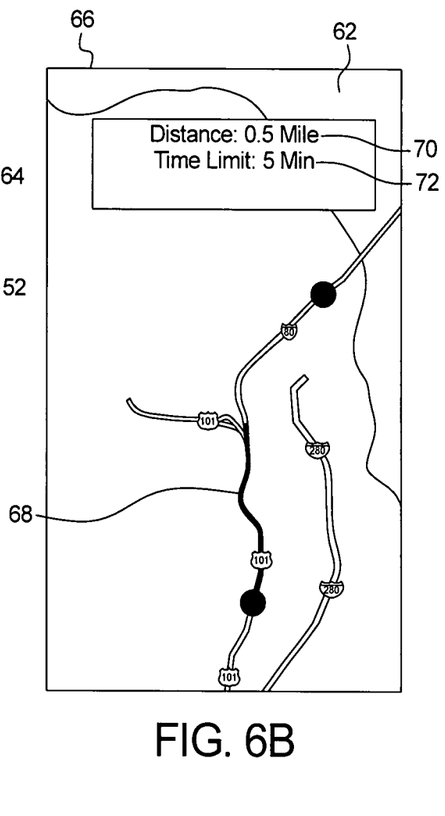
FIG. 6B is an example of an exercise challenge screen of a graphical user interface of a geolocation-based data sharing system.

FIG. 6B is a subsequent exercise challenge screen 66 of the graphical user interface of a geolocation-based data sharing system 10. As shown in FIG. 6B, once an exercise challenge 62 has been initiated, the system 10 may track the user's progress 68 in real time and display it for them. In this example, the end user has 0.5 miles remaining, as indicated in the distance display 70, and five minutes remaining, as indicated in the time limit display 72, to complete the challenge 62. The system 10 may also provide directions similar to GPS navigation apps (e.g., Google Maps) to keep end users on route and help them complete the challenge. The system 10 could also display messages of encouragement left by the user who set the challenge as it is attempted.

Figure 6C:
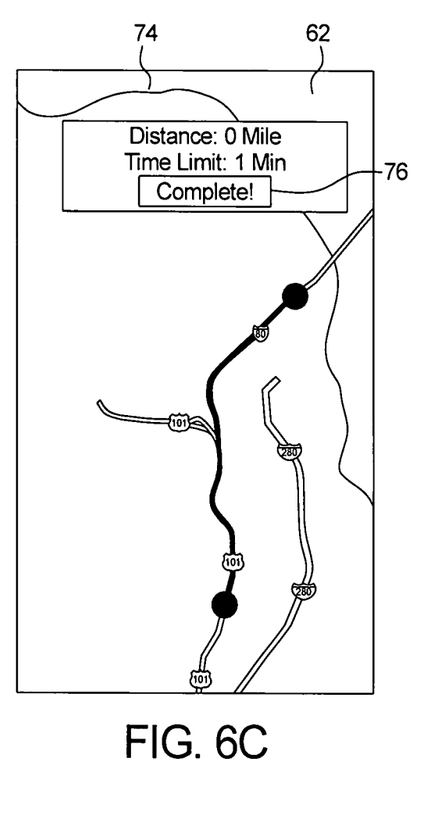
FIG. 6C is an example of an exercise challenge completion screen of a graphical user interface of a geolocation-based data sharing system.

FIG. 6C is an exercise challenge completion screen 74 of the graphical user interface of a geolocation-based data sharing system 10. As shown in FIG. 6C, when an exercise challenge 62 is successfully completed, the system 10 may display a message 76 confirming as much and then display for the end user their reward for completing the given challenge. In this example, the reward is the ability to view the dating profile (see FIG. 4) of the end user 18a who set up the challenge.

Figure 7:
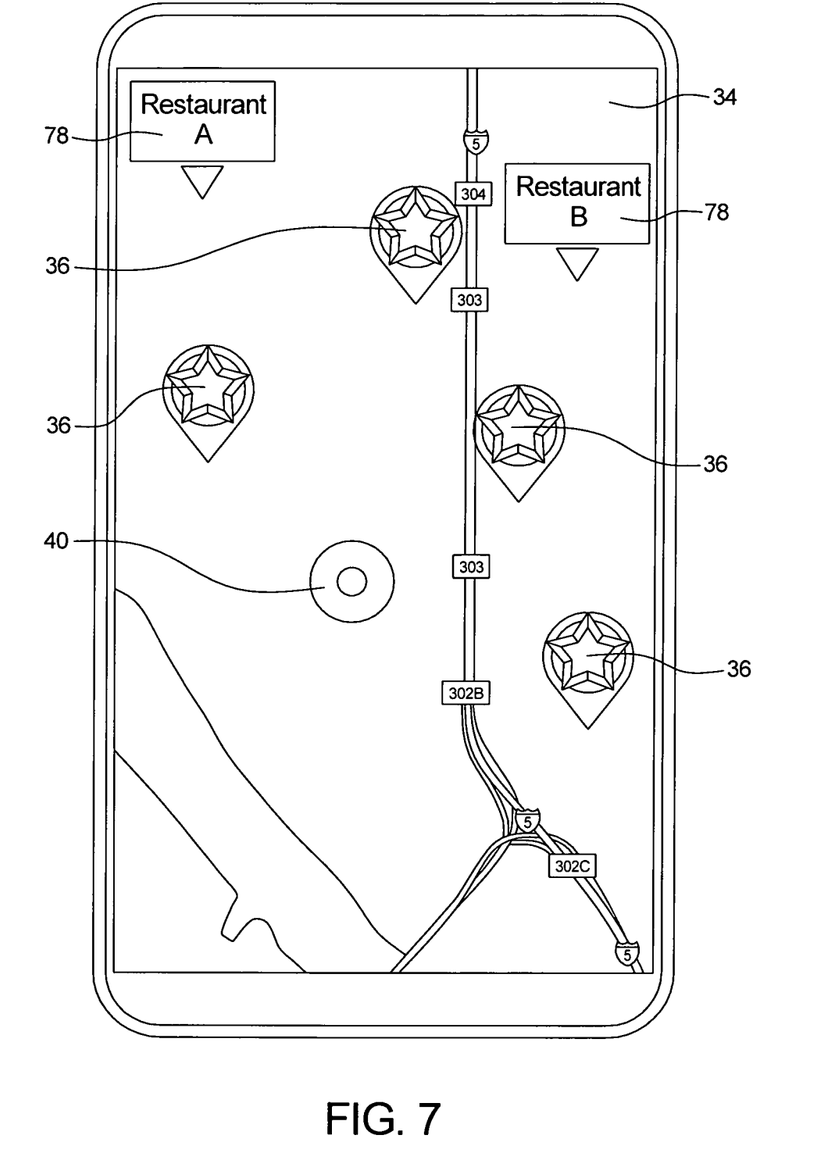
FIG. 7 is an example of a geo-marker browsing screen of the graphical user interface of a geolocation-based data sharing system featuring paid advertisements.

FIG. 7 is a geo-marker browsing screen 34 of the graphical user interface of a geolocation-based data sharing system 10 featuring paid advertisements. As shown in FIG. 2C, the user 18 is displayed the geolocation markers 36 of other users 18 using their map view 38. Users can also see their own location 40 relative to the other user's location 36. The end user 18 is also displayed two paid advertisements 78 for restaurants in the area (Taco Bell and Chick-fil-a).

Figure 8:
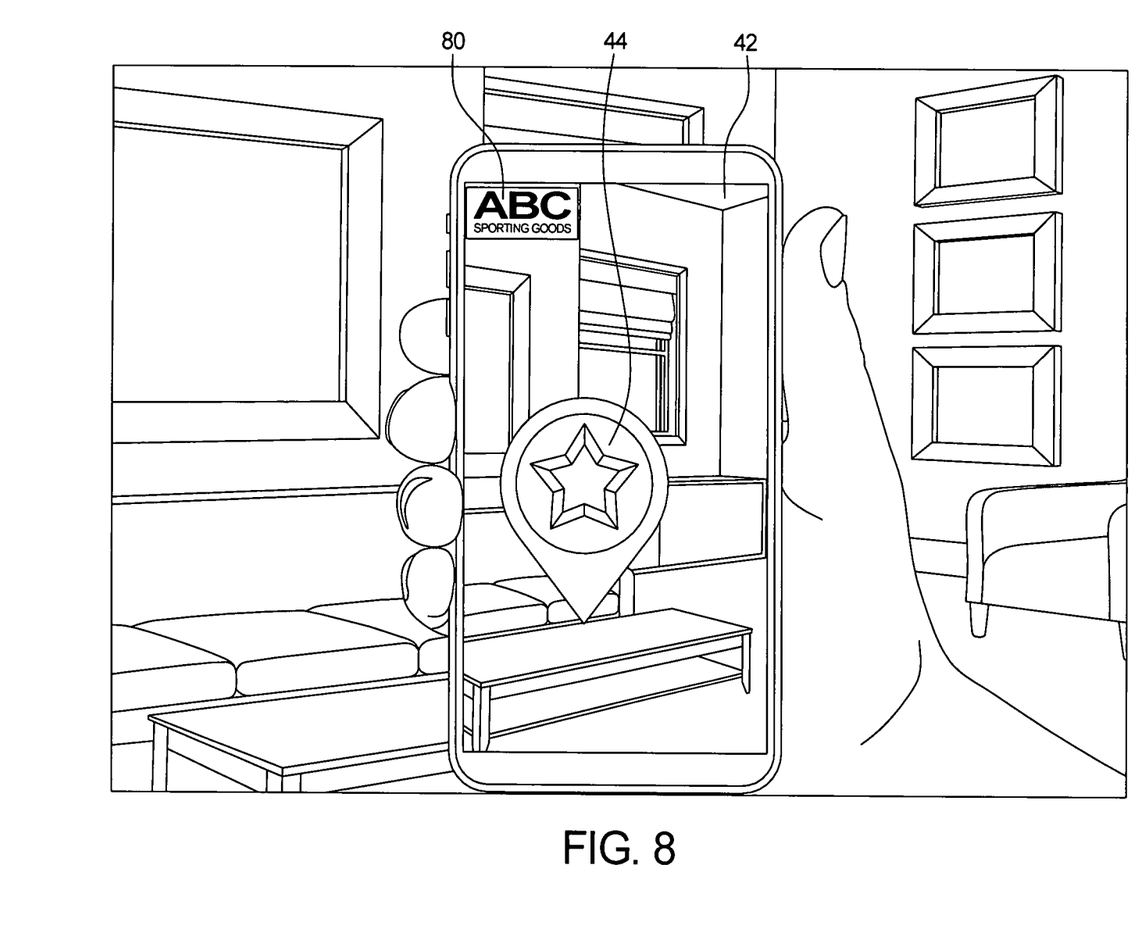
FIG. 8 is an example of an augmented reality screen of a graphical user interface of a geolocation-based data sharing system featuring a paid advertisement.

FIG. 8 is an augmented reality screen 42 of the graphical user interface of a geolocation-based data sharing system 10 featuring a paid advertisement. As shown in FIG. 8, an augmented reality geolocation marker icon 44 is visible on the camera view of the mobile device 14 when the user 18 is within a close proximity of the marker 44. An advertisement 80 for Dick's Sporting Goods is also shown in the AR view. It should be noted the advertisements 80 displayed by the system may be random in nature or derived from data collected by the system concerning end users likes, dislikes, etc. and the advertising content may be loaded into the present system via date integration with various ad networks, external databases, etc.

Figure 9:
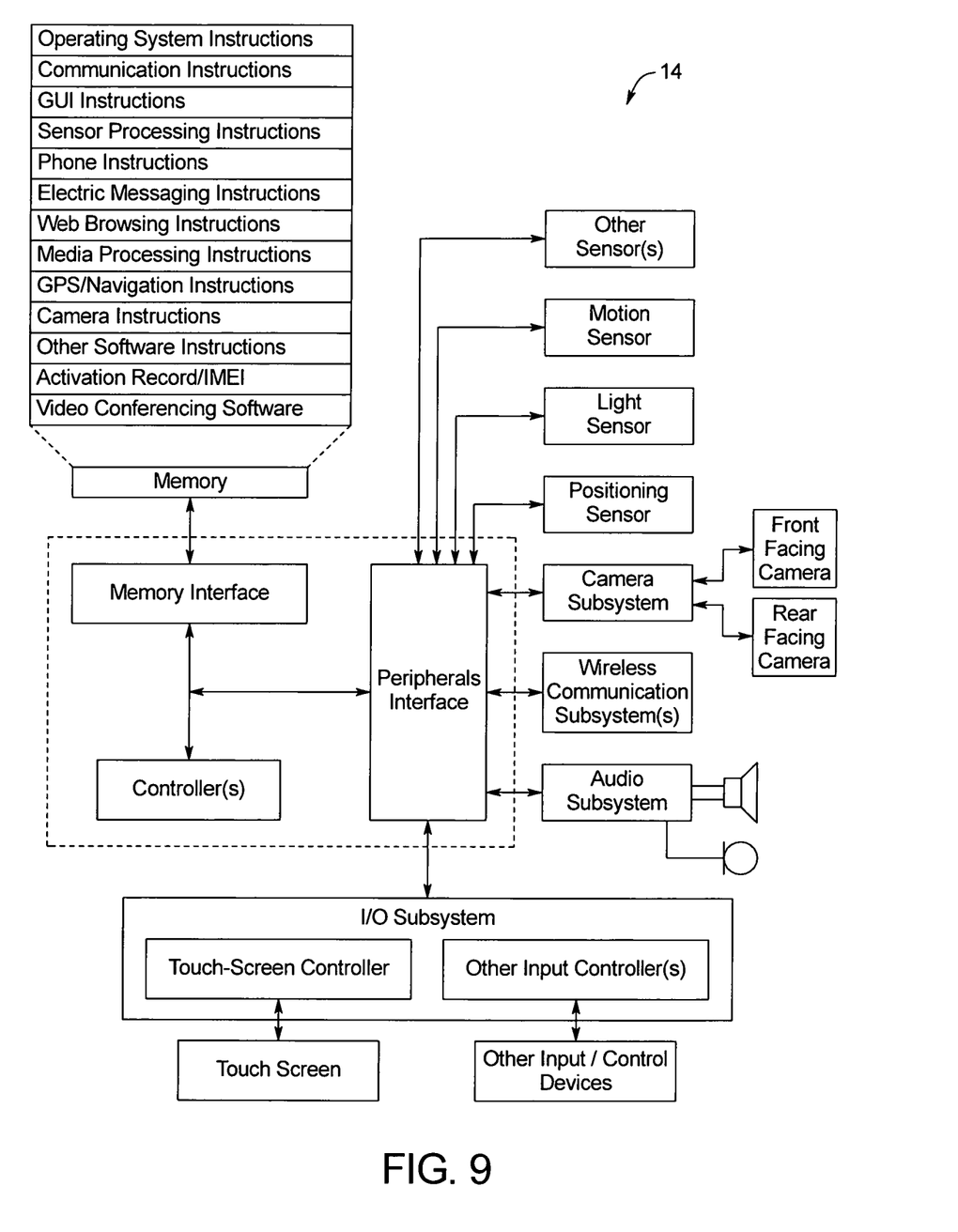
FIG. 9 is a diagram of the components of a smartphone capable of running an embodiment of the geolocation-based data sharing system.

FIG. 9 is a diagram of the components of a smartphone capable of running an embodiment of the geolocation-based data sharing system. As shown in FIG. 9, the geolocation-based data sharing system 10 may be run on a smartphone featuring a processor, memory, etc. The smartphone shown features a front facing camera and read facing camera. The front facing camera is the camera which is faced towards the end user when operating the smartphone's screen (e.g., the camera utilized for selfies, etc.) while the rear facing camera is the one opposite to the smartphone's screen (e.g., the camera positioned on the back of the device). The present system may utilize the front facing camera, rear facing camera, or both and as technology advances, the present system is fully realized as being able to utilize any number of end user device cameras to capture images, survey geolocation markers via augmented reality, etc.

It should also be noted that various changes and modifications to the presently preferred embodiments described herein will be apparent to those skilled in the art. Such changes and modifications may be made without departing from the spirit and scope of the present invention and without diminishing its attendant advantages.

I claim:

1. A geolocation-based data sharing system comprising:
   a first mobile user device including a first Global Positioning System (GPS) receiver, a first communications module, and a first graphical user interface;
   one or more second mobile user devices, each second mobile user device including a second GPS receiver, a second communications module, and a second graphical user interface;
   a server including one or more data storage devices, wherein the server is in communication with each of the first communications module and the second communications module, the server further including a controller and a memory coupled to the controller, wherein the memory is configured to store program instructions executable by the controller; wherein in response to executing the program instructions, the controller is configured to:
   receive, by the server and from the first mobile user device, two or more data sets to be stored in the memory storage device, each of the two or more data sets including a photograph of a first user;
   receive, by the server and from the first mobile user device, a unique GPS location and an associated set of searchable data to be stored in the memory storage device in association with each of the two or more data sets, wherein each of the two or more data sets each associated GPS location, and the associated set of searchable data define a unique expiring geo-marker, wherein the first mobile user device is located at each associated GPS location when each unique expiring geo-marker is created at the associated GPS location, each unique expiring geo-marker expires according to an associated expiration criterion, and each unique expiring geo-marker remains at the associated GPS location until it expires;
   store and associate, by the server in the memory storage device, each unique expiring geo-marker;
   in response to receiving, by the server and from one of the second mobile user devices, search input data matching at least one of the associated sets of searchable data, display a visual representation of a geolocation marker identifying the at least one matched GPS location relative to the current location of the one of the second mobile user devices on a graphical user interface in the one of the second mobile user devices;
   simultaneously while displaying the visual representation of the geolocation marker identifying the at least one matched GPS location on the graphical user interface in the one of the second mobile user devices, also display a visual representation of another geolocation marker identifying another matched GPS location on the graphical user interface in the one of the second mobile user devices, wherein the another matched GPS location is associated with searchable data matching the search input data and is not received from the first user mobile device; and
   receive a request, by the server and from the one of the second mobile user devices, to access the one of the two or more data sets associated with the at least one matched GPS location;
   wherein, when the one of the second mobile user devices is within a first distance of the at least one matched GPS location, enable the one of the second mobile user devices to access the associated data set including the photograph of the first user, further wherein, when the one of the second mobile user devices is outside of the first distance of the at least one matched GPS location, do not enable the one of the second mobile user devices to access the associated data set, wherein each access to the associated data set by a unique second user device is an interaction; and
   in response to gaining access to the associated data set, enable the one of the second mobile user devices to communicate with the first use device and retain access to at least the photograph of the first user unless subsequently blocked by the first user;
   wherein the expiration criterion is either a duration of time or a number of interactions.

2. The system of claim 1, wherein the first user device and the one of the second mobile user devices communicate peer-to-peer.

3. The system of claim 1, wherein the first user device and the one of the second mobile user devices communicate via the server.

4. The system of claim 1, wherein the two or more data sets including a photograph of a first user is a dating profile and includes an age or age range and a sex, or gender.

5. The system of claim 4, wherein the first user chooses the first distance.

6. The system of claim 1, wherein the search input data matching the first set of searchable data is communicated to the server by the one of the second mobile user devices in response to a manually executed search, by a user of the one of the second mobile user devices.

7. The system of claim 1, wherein the search input data matching the first set of searchable data is communicated to the server by the one of the second mobile user devices automatically in response to the one of the second mobile user devices entering a second distance of the at least one matched GPS location.

8. The system of claim 1, wherein at least one associated GPS location is updated in real-time to be the position, of the first mobile user device.

9. The system of claim 1, wherein, when the one of the second mobile user devices is inside the first distance of a first GPS location, the server enables the one of the second mobile user devices to access the first associated data set only after the one of the second mobile user devices has interacted in a prescribed manner with a second GPS location.

10. The system of claim 1, wherein displaying a visual representation of, a geolocation marker identifying the at least one matched GPS location relative to the current location of the one of the second mobile user devices on a graphical user interface in the one of the second mobile user devices includes displaying an augmented reality element as the visual representation of the geolocation marker.

11. A geolocation-based data sharing method comprising the steps of:
providing a server including one or more data storage devices, wherein the server is in communication with each of a first communications module in a first mobile user device and a second communications module in each of one or more second mobile user devices;
receiving, by the server and from the first mobile user device, two or more data sets to be, stored in the memory storage device, each of the two or more data sets including a photograph of a first user;
receiving, by the server and from the first mobile user device, a unique GPS location and an associated set of searchable data to be stored in the memory storage device in association with each of the two or more data sets, wherein each of the two or more data sets each associated GPS location, and the associated set of searchable data define a unique expiring geo-marker wherein the first mobile user device is located each associated GPS location when each unique expiring, geo-marker is created at the associated GPS location, each unique expiring geo-marker expires according to an associated expiration criterion, and each unique expiring geo-marker remains at the associated GPS location until it expires;
storing and associating, by the server in the memory storage device, each unique expiring geo-marker;
in response to receiving, by the server and from one of the second mobile user devices, search input data matching at least one of the associated sets of searchable data, display a visual representation of a geolocation marker identifying the at least one matched GPS location relative to the current location of the one of the second mobile user devices on a graphical user interface in the one of the second mobile user devices;
simultaneously while displaying the visual representation of the geolocation marker identifying the at least one matched GPS location on the graphical user interface in the one of the second mobile user devices, also displaying a visual representation of another geolocation marker identifying another matched GPS location on the graphical user interface in the one of the second mobile user devices, wherein the another matched GPS location is associated with searchable data matching the search input data and is not received from the first user mobile device; and
receiving a request, by the server and from the one of the second mobile user devices, to access the one of the two or more data sets associated with the at least one matched GPS location;
wherein, when the one of the second mobile user devices is within a first distance of the at least one matched GPS location, enable the one of the second mobile user devices to access the associated data set including the photograph of the first user, further wherein, when the one of the second mobile user devices is outside of the first distance of the at least one matched GPS location, do not enable the one of the second mobile user devices to access the associated data set, wherein each access to the associated data set by a unique second user device is an interaction; and
in response to gaining access to the associated data set, enabling, by the server, the one of the second mobile user devices to communicate with the first user device and retain access to at least the photograph of the first user unless subsequently blocked by the first user;
wherein the expiration criterion is either a duration of time or a number of interactions.

12. The method of claim 11, wherein the first user device and the one of the second mobile user devices communicate peer-to-peer.

13. The method of claim 11, wherein the first user device and the one of the second mobile user devices communicate via the server.

14. The method of claim 11, wherein the two or more data sets including a photograph of a first user is a dating profile and includes an age or age range and a sex or gender.

15. The method of claim 14, wherein the first user chooses the first distance.

16. The method of claim 11, wherein the search input data matching the first set of searchable data is communicated to the server by the one of the second mobile user devices in response to a manually executed search by a user of the one of the second mobile user devices.

17. The method of claim 11, wherein the search input data matching the first set of searchable data is communicated to the server by the one of the second mobile user devices automatically in response to the one of the second mobile user devices entering a second distance of the at least one matched GPS location.

18. The method of claim 11, wherein at least one associated GPS location is updated in real-time to be the position of the first mobile user device.

19. The method of claim 11, wherein, when the one of the second mobile user devices is inside the first distance of a first GPS location, the server enables the one of the second mobile user devices to access the associated data set only after the one of the second mobile user devices has interacted in a prescribed manner with a second GPS location.

20. The method of claim 11, wherein displaying a visual representation of a geolocation marker identifying the at least one matched GPS location relative to the current location of the one of the second mobile user devices on a graphical user interface in the one of the second mobile user devices includes displaying an augmented reality element as the visual representation of the geolocation marker.

* * * * *